(12) United States Patent
Kaino et al.

(10) Patent No.: US 10,596,969 B2
(45) Date of Patent: *Mar. 24, 2020

(54) ELECTRONIC MIRROR CONTROL DEVICE

(71) Applicant: MAZDA MOTOR CORPORATION, Hiroshima (JP)

(72) Inventors: Akira Kaino, Hiroshima (JP); Yoshitaka Fujihara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/760,758

(22) PCT Filed: Mar. 14, 2017

(86) PCT No.: PCT/JP2017/010062
§ 371 (c)(1),
(2) Date: Mar. 16, 2018

(87) PCT Pub. No.: WO2017/169706
PCT Pub. Date: Oct. 5, 2017

(65) Prior Publication Data
US 2018/0257569 A1 Sep. 13, 2018

(30) Foreign Application Priority Data

Mar. 30, 2016 (JP) .................. 2016-067530

(51) Int. Cl.
*B60R 11/02* (2006.01)
*B60R 1/12* (2006.01)
(Continued)

(52) U.S. Cl.
CPC .......... *B60R 1/12* (2013.01); *B60R 1/00* (2013.01); *B60R 1/006* (2013.01);
(Continued)

(58) Field of Classification Search
CPC .............................. B60R 2300/8066
See application file for complete search history.

(56) References Cited

U.S. PATENT DOCUMENTS

| 6,618,672 B2 * | 9/2003 | Sasaki ............... B60R 1/00 340/435 |
| 2002/0087269 A1 | 7/2002 | Sasaki et al. |
| 2015/0243046 A1 | 8/2015 | Yoshida et al. |

FOREIGN PATENT DOCUMENTS

| JP | 2000-127849 A | 5/2000 |
| JP | 2002-104113 A | 4/2002 |

(Continued)

OTHER PUBLICATIONS

International Search Report issued in PCT/JP2017/010062; dated May 30, 2017.

*Primary Examiner* — Georgia Y Epps
*Assistant Examiner* — Jacob R Stern
(74) *Attorney, Agent, or Firm* — Studebaker & Brackett PC

(57) ABSTRACT

An electronic mirror control device includes: an imager which is installed in a vehicle, and captures a rearward image including a rear side surface of the vehicle during traveling; a display which displays the rearward image captured by the imager; a calculator which calculates a position of a vanishing point from the rearward image; an extractor which extracts, in the rearward image, a rear side surface region where the rear side surface of the vehicle is displayed; and a display controller which displays, in the rear side surface region, a vanishing point line which coincides with a straight line passing through the vanishing point.

4 Claims, 16 Drawing Sheets

(51) Int. Cl.
*H04N 7/18* (2006.01)
*B60R 1/00* (2006.01)
*G08G 1/16* (2006.01)

(52) U.S. Cl.
CPC ............ *B60R 11/0229* (2013.01); *G08G 1/16* (2013.01); *G08G 1/167* (2013.01); *H04N 7/18* (2013.01); *H04N 7/181* (2013.01); *B60R 2001/1253* (2013.01); *B60R 2300/303* (2013.01); *B60R 2300/305* (2013.01); *B60R 2300/8066* (2013.01)

(56) References Cited

FOREIGN PATENT DOCUMENTS

| | | |
|---|---|---|
| JP | 2007-026321 A | 2/2007 |
| JP | 2012-170127 A | 9/2012 |
| JP | 2013-183298 A | 9/2013 |
| JP | 2013-187562 A | 9/2013 |
| JP | 2014-116756 A | 6/2014 |
| JP | 2015-056851 A | 3/2015 |
| JP | 2015-180041 A | 10/2015 |
| WO | 2013/108371 A1 | 7/2013 |

* cited by examiner

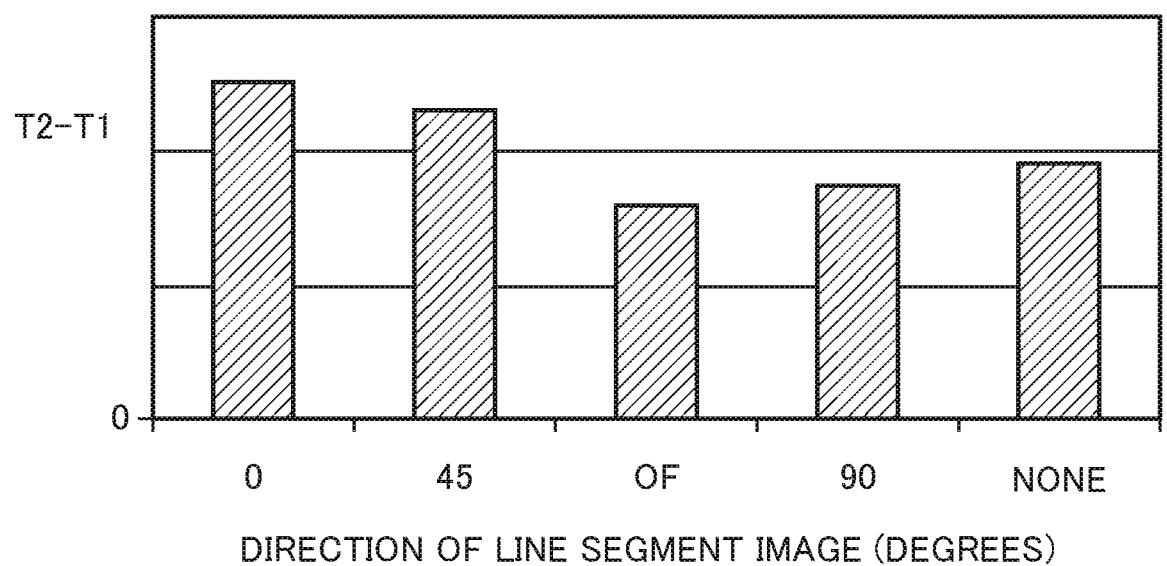

ELECTRONIC MIRROR CONTROL DEVICE

TECHNICAL FIELD

The technique disclosed herein relates to an electronic mirror control device for controlling display of a rearward image including a rear side surface of a vehicle, the rearward image being captured by an imager.

BACKGROUND ART

Conventionally, there is proposed a device that displays, on a display installed inside a vehicle, an image of a rear side surface and a rear side of the vehicle captured by an in-vehicle camera (see Patent Literature 1). According to the technique described in Patent Literature 1, the visibility of a driver is improved by displaying the image on the display while partially compressing the image.

CITATION LIST

Patent Literature

Patent Literature 1: JP 2012-170127 A

SUMMARY OF INVENTION

During traveling, a driver needs to accurately and safely grasp a traveling space in any environment. In a case where there is no indirect vision in a side-view mirror allowing viewing of a rear side of the vehicle or on a display for displaying the rear side of the vehicle captured by a camera, the driver turns the driver's body or head to look at the rear side. In this case, the driver can intuitively grasp the position, in the traveling environment, of the rear side environment the driver is looking at. However, because the head is turned or the gaze is moved, the time when the driver looks aside becomes long.

On the other hand, in the case of using an indirect vision in a side-view mirror or on a display, the rear side of the vehicle can be checked without turning the body or the head, and thus the time when the driver looks aside is reduced. However, because the traveling environment is not directly looked at, grasping of the traveling environment from the indirect vision takes time.

Accordingly, even in the case of using the indirect vision, the traveling environment, such as a positional relationship of the own vehicle, is desired to be grasped in a short time from the indirect vision. However, Patent Literature 1 described above does not give enough consideration to this point.

The technique disclosed herein has its object to enable a traveling environment to be grasped in a short time from an indirect vision.

To solve the problem described above, an aspect of the technique disclosed herein includes: an imager which is installed in a vehicle, and captures a rearward image including a rear side surface of the vehicle during traveling; a display which displays the rearward image captured by the imager; a calculator which calculates a position of a vanishing point from the rearward image; an extractor which extracts, in the rearward image, a rear side surface region where the rear side surface of the vehicle is displayed; and a display controller which displays, in the rear side surface region, a vanishing point line which coincides with a straight line passing through the vanishing point.

According to this electronic mirror control device, a driver can grasp the traveling environment in a short time based on an indirect vision displayed on the display by displaying the vanishing point line which serves as an optical flow in the rear side surface region where no optical flow exists.

BRIEF DESCRIPTION OF DRAWINGS

FIG. 16 is a diagram showing an experiment result for a second subject.

DESCRIPTION OF EMBODIMENTS

Figure 1:
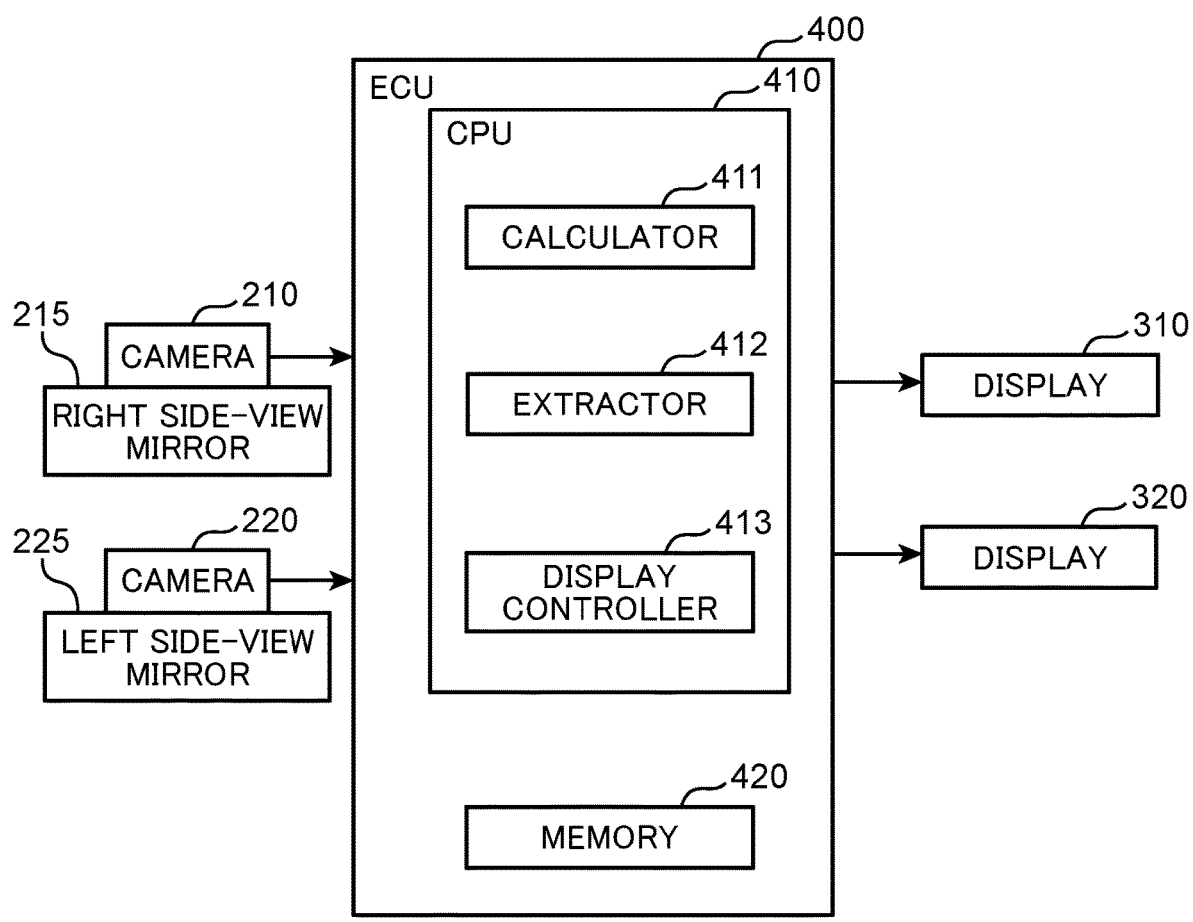
FIG. 1 is a block diagram schematically showing a configuration of a vehicle according to a present embodiment.

Hereinafter, an embodiment of the present disclosure will be described with reference to the drawings. The same reference numerals are assigned to the same elements in the drawings, and a repeated description is omitted as appropriate.

FIG. 1 is a block diagram schematically showing a configuration of a vehicle according to the present embodiment. A vehicle 100 is a four-wheeled vehicle, for example. As shown in FIG. 1, the vehicle 100 includes cameras 210, 220 (examples of the imager), displays 310, 320 (examples of the display), and an electronic control unit (ECU) 400.

For example, the camera 210 is attached to a right side-view mirror 215 of the vehicle 100, with an optical axis of the camera 210 extending towards the rear side of the vehicle 100. The camera 210 successively captures, every predetermined period of time (1/60 seconds for instance), a rearward image of the right rear side of the vehicle 100 including a rear side surface on the right side of the vehicle 100. The camera 210 may be attached to a position where the right side-view mirror was to be attached, with the optical axis of the camera 210 extending towards the rear side of the vehicle 100, instead of being attached to the right side-view mirror 215.

For example, the camera 220 is attached to a left side-view mirror 225 of the vehicle 100, with the optical axis of the camera 220 extending towards the rear side of the vehicle 100. The camera 220 successively captures, every predetermined period of time (1/60 seconds for instance), a rearward image of the left rear side of the vehicle 100 including a rear side surface on the left side of the vehicle 100. The camera 220 may be attached to a position where the left side-view mirror was to be attached, with the optical axis of the camera 220 extending towards the rear side of the vehicle 100, instead of being attached to the left side-view mirror 225.

For example, the camera 220 is attached to a left side-view mirror of the vehicle 100, with the optical axis of the camera 220 extending towards the rear side of the vehicle 100. The camera 220 successively captures, every predetermined period of time (1/60 seconds for instance), a rearward image of the left rear side of the vehicle 100 including a rear side surface on the left side of the vehicle 100. The camera 220 may be attached to a position where the left side-view mirror was to be attached, with the optical axis of the camera 220 extending towards the rear side of the vehicle 100, instead of being attached to the left side-view mirror.

The display 310 is disposed in front of the driver's seat, slightly on the right side. The display 310 displays the latest rearward image among the rearward images of the right rear side of the vehicle 100 successively captured by the camera 210 every predetermined period of time (1/60 seconds for instance). The display 320 is disposed in front of the driver's seat, slightly on the left side. The display 320 displays the latest rearward image among the rearward images of the left rear side of the vehicle 100 successively captured by the camera 220 every predetermined period of time (1/60 seconds for instance).

For example, the display 310, 320 includes a liquid crystal display panel. The display 310, 320 may include another display device such as an organic electro luminescence (EL) panel, without being limited to the liquid crystal display panel.

The ECU 400 controls the operation of the entire vehicle 100. The ECU 400 includes a central processing unit (CPU) 410, a memory 420, and other peripheral circuits. For example, the memory 420 is configured by a semiconductor memory such as a flash memory, a hard disk, or another storage element. The memory 420 includes a frame memory for temporarily storing each rearward image captured by the cameras 210, 220, a memory for storing programs, a memory for temporarily storing data, and the like. The memory 420 may alternatively be configured by a single memory including a region for temporarily storing each rearward image captured by the cameras 210, 220, a region for storing programs, and a region for temporarily storing data.

The CPU 410 functions as a calculator 411, an extractor 412, and a display controller 413, by operating according to programs stored in the memory 420. The calculator 411 calculates the position of a vanishing point on each display 310, 320 from each rearward image captured by each camera 210, 220.

The extractor 412 extracts, from the rearward image captured by the camera 210, a rear side surface region 316 (FIGS. 3 to 5 described later) where the rear side surface on the right side of the vehicle 100 is displayed. The extractor 412 extracts, from the rearward image captured by the camera 220, a rear side surface region where the rear side surface on the left side of the vehicle 100 is displayed.

The display controller 413 displays, on the respective displays 310, 320, the latest rearward images captured by the respective cameras 210, 220 and stored in respective frame memories in the memory 420. When displaying the rearward images captured by the cameras 210, 220 on the displays 310, 320, the display controller 413 displays the images in a horizontally reversed manner. In this manner, an image reflected in the right side-view mirror is displayed on the display 310, and an image reflected in the left side-view mirror is displayed on the display 320. Functions of the calculator 411, the extractor 412, and the display controller 413 will be described later in detail.

Figure 2:
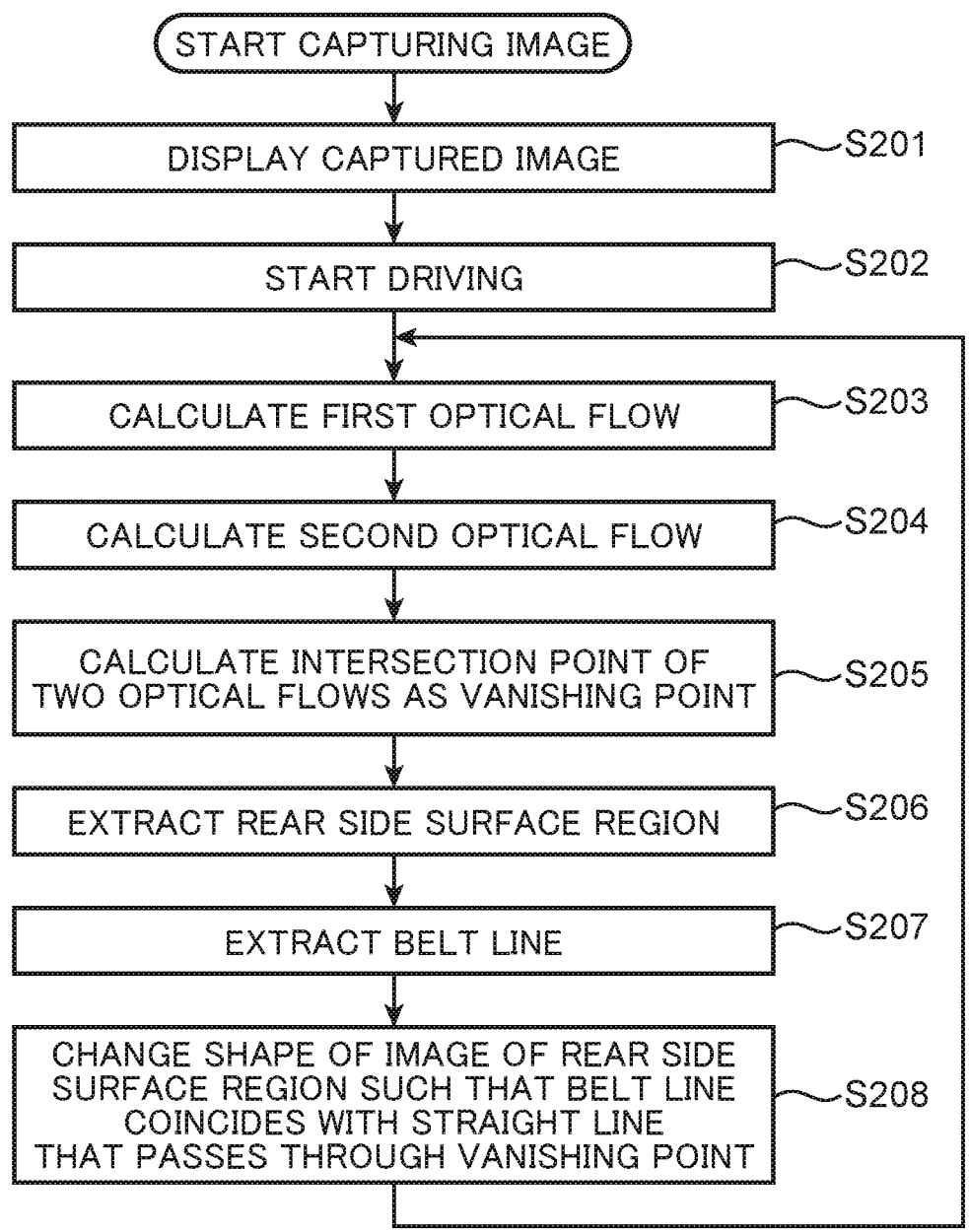
FIG. 2 is a flowchart schematically showing an example of an operation of the vehicle.
Figure 3:
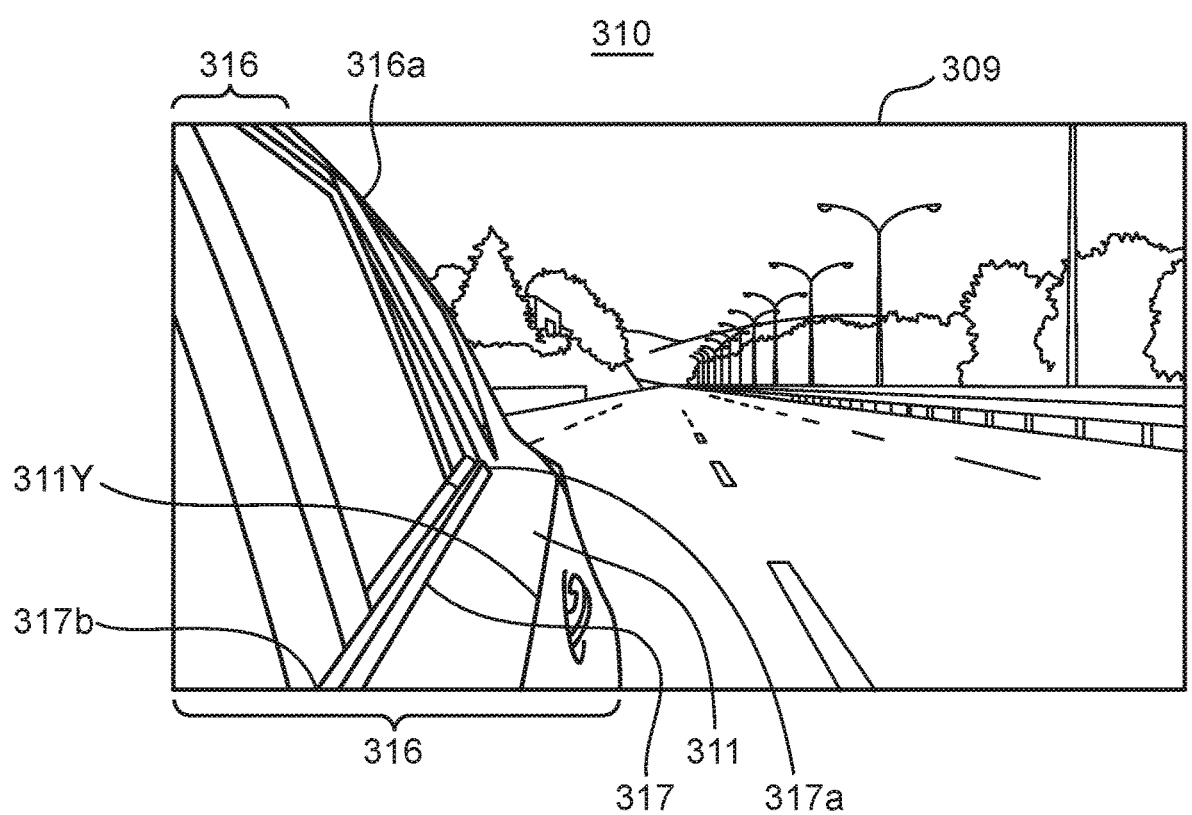
FIG. 3 is a diagram showing an example of a rearward image which is displayed on a display while the vehicle is stopped.
Figure 4:
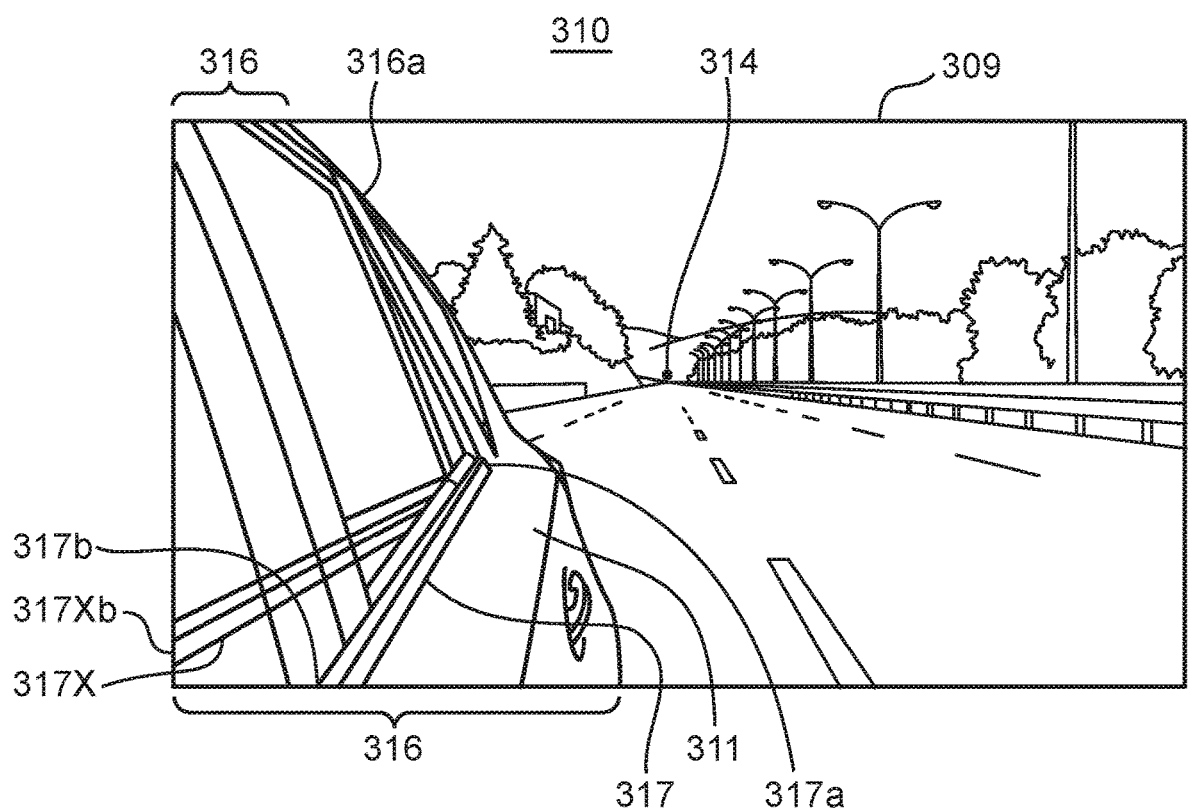
FIG. 4 is a diagram for describing a change in shape of the rearward image.
Figure 5:
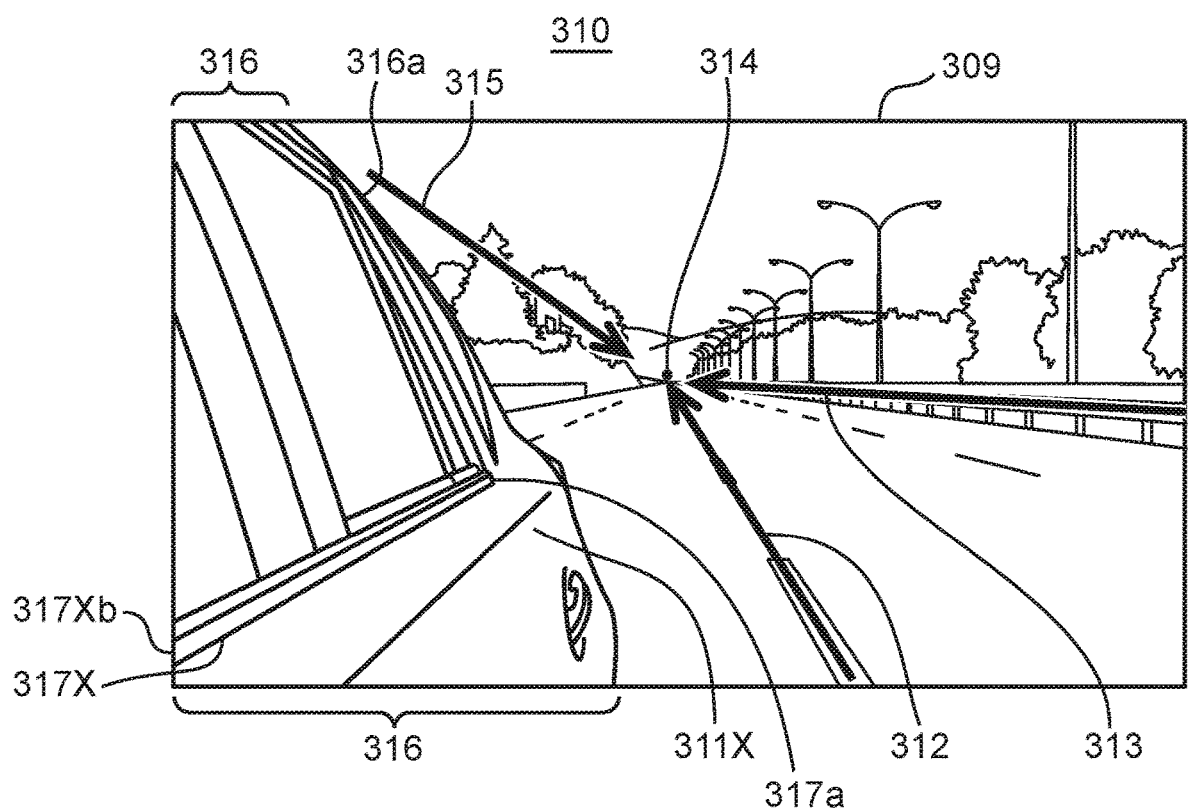
FIG. 5 is a diagram showing an example of the rearward image which is displayed on the display during traveling of the vehicle.

FIG. 2 is a flowchart schematically showing an example of an operation of the vehicle 100. FIG. 3 is a diagram showing an example of a rearward image 309 which is displayed on the display 310 while the vehicle 100 is stopped. FIG. 4 is a diagram for describing a change in shape of the rearward image 309. FIG. 5 is a diagram showing an example of the rearward image 309 which is displayed on the display 310 during traveling of the vehicle 100. In the following, a description will be given of the rearward image captured by the camera 210, but the same can be applied to the rearward image captured by the camera 220.

When the engine is started for example, capturing image by the camera 210 is started, and the operation in FIG. 2 is started. In step S201, the display controller 413 displays, on the display 310, the latest rearward image 309 captured by the camera 210 and stored in the frame memory of the memory 420. In FIG. 3, the vehicle 100 is stopped, and the display controller 413 displays, on the display 310, the rearward image 309 captured by the camera 210 and including a rear side surface 311 on the right side of the vehicle 100.

Next, in step S202, the vehicle 100 starts driving. Then, the calculator 411 calculates, in step S203, a first optical flow from the rearward image captured by the camera 210, and calculates, in step S204, a second optical flow different from the first optical flow.

An optical flow expresses the motion of an object in an image by a vector. The calculator 411 may extract corresponding feature points from a plurality of rearward images, and may calculate a line connecting the extracted corresponding feature points as the first or second optical flow. The calculator 411 may calculate the first and second optical flows using a known method such as Lucas-Kanade method, or Horn-Schunk method. A first optical flow 312 and a second optical flow 313, which are not actually displayed on the display 310, are shown in FIG. 5.

Next, in step S205, the calculator 411 calculates an intersection point of the first optical flow 312 and the second optical flow 313 as a vanishing point 314. The vanishing point means a point where lines which are in reality parallel to each other intersect each other when the lines are drawn as non-parallel lines in perspective.

In FIG. 2, the intersection point of the two optical flows 312, 313 is calculated as the vanishing point 314, but the calculator 411 may further calculate a third optical flow 315, as shown in FIG. 5. In this case, the calculator 411 may calculate a center of intersection points of the first to third optical flows 312, 313, 315 as the vanishing point.

Next, in step S206, the extractor 412 extracts, on the display 310, the rear side surface region 316 where the rear side surface 311 of the vehicle 100 is displayed. The extractor 412 may extract the rear side surface region 316 by a template matching method. Alternatively, the extractor 412 may compare respective pixel values of a plurality of rearward images captured by the camera 210 every predetermined period of time, and may extract a region where there is no change in the pixel values as the rear side surface region 316.

The ECU 400 may include a camera controller for changing the angle of the optical axis of the camera 210 according to an operation of the driver, so that a capturing range of the camera 210 can be changed. The memory 420 may store data associating the angle of the optical axis of the camera 210 with the rear side surface region 316. In such a case, the extractor 412 may acquire the current angle of the optical axis of the camera 210 from the camera controller, and may extract the rear side surface region 316 which is associated with the acquired angle of the optical axis from the memory 420.

Next, in step S207, the display controller 413 extracts a belt line 317 in the rear side surface region 316 extracted in step S206. The belt line 317 is a line which extends in a horizontal direction at a lower end of a side window of a vehicle body, a line which divides an upper part and a lower part of the vehicle body at the position of the window, and an upper end line of the lower part of the vehicle body, the upper end line extending along a door in the horizontal direction.

Image data of the belt line 317 may be stored in advance in the memory 420. The display controller 413 may extract the belt line 317 by the template matching method, with the image data of the belt line 317 stored in the memory 420 as the template.

In the case where the camera controller for changing the angle of the optical axis of the camera 210 according to an operation of the driver is provided as described above, the memory 420 may store data associating the angle of the optical axis of the camera 210 with the belt line 317. In such a case, the display controller 413 may acquire the current angle of the optical axis of the camera 210 from the camera controller, and may extract the belt line 317 which is associated with the acquired angle of the optical axis from the memory 420.

Next, in step S208, the display controller 413 changes the shape of the image of the rear side surface region 316 such that the belt line 317 coincides with a straight line that passes through the vanishing point 314. For example, the display controller 413 first fixes a rear end 317a of the belt line 317, rotates the belt line 317 such that the belt line 317 coincides with a straight line that passes through the rear end 317a and the vanishing point 314, and then, extends the belt line 317 to cause a front end 317b to coincide with an outer rim of the display 310. A belt line 317X (an example of the vanishing point line), after transformation, including the rear end 317a and a front end 317Xb, and coinciding with a straight line that passes through the vanishing point 314 is thus obtained as shown in FIG. 4.

Next, the display controller 413 rotates and reduces, or rotates and enlarges the rear side surface region 316 in a state where a boundary line 316a is fixed, such that linearity of each pixel in the rear side surface region 316 is maintained and the belt line 317 is caused to coincide with the belt line 317X.

Specifically, for example, the display controller 413 determines a transformation matrix of affine transformation for transforming the belt line 317 into the belt line 317X, from a correspondence relationship of a plurality of points in the belt line 317 and the belt line 317X before and after the transformation. Furthermore, in the state where the boundary line 316a of the rear side surface region 316 is fixed, the display controller 413 performs coordinate transformation on the entire rear side surface 311 displayed in the rear side surface region 316, using the determined transformation matrix. Moreover, the display controller 413 performs interpolation with respect to a pixel where a gap is generated by the coordinate transformation, using data of peripheral pixels.

As shown in FIG. 5, due to step S208 including the procedure described above, a rear side surface 311X after coordinate transformation, which includes the belt line 317X coinciding with the straight line that passes through the vanishing point 314, is displayed in the rear side surface region 316.

Then, the process returns to step S203, and the steps described above are repeated. The operation in FIG. 2 may end when the vehicle 100 is brought to a stop.

As described above, according to the present embodiment, coordinate transformation is performed on the rear side surface region 316 such that the belt line 317X coincides with a straight line that passes through the vanishing point 314. The belt line 317X which coincides with the straight line that passes through the vanishing point 314 and which serves the same role as an optical flow is thus displayed in the rear side surface region 316 where no optical flow exists. As a result, the driver can grasp the traveling environment, such as the position of the driver's vehicle, in a short time when looking at the display 310.

In FIG. 5, the display controller 413 performs coordinate transformation on the rear side surface region 316 such that the belt line 317 coincides with the straight line that passes through the vanishing point 314, but the display controller 413 may alternatively perform coordinate transformation on the rear side surface region 316 such that, instead of the belt line 317, a character line 311Y (FIG. 3) of the vehicle 100 coincides with a straight line that passes through the vanishing point 314. The character line 311Y is a line which is formed by surfaces merging to establish aesthetic automotive design, or a line which is added to a smooth surface of the vehicle to establish aesthetic automotive design.

Furthermore, in FIG. 5, the display controller 413 only performs coordinate transformation on the rear side surface region 316 such that the belt line 317X is obtained, but this example is not restrictive.

Figure 6:
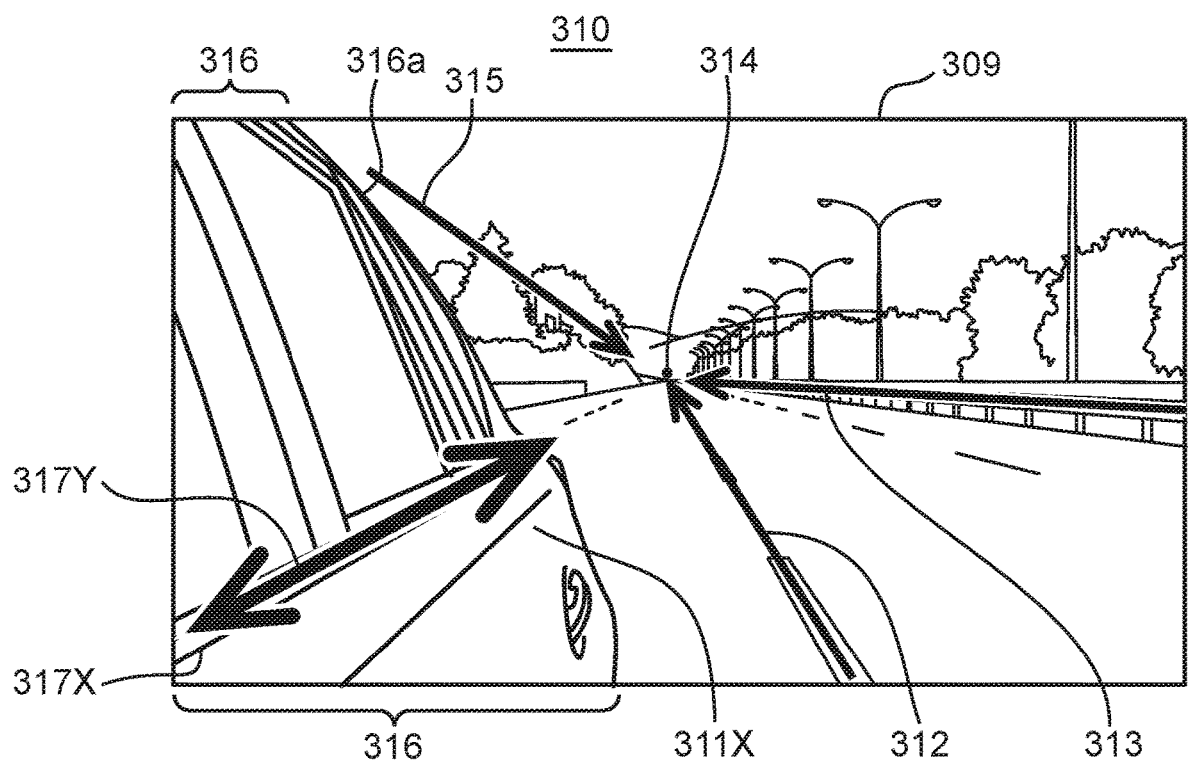
FIG. 6 is a diagram showing a different example of the rearward image which is displayed on the display.
Figure 9:
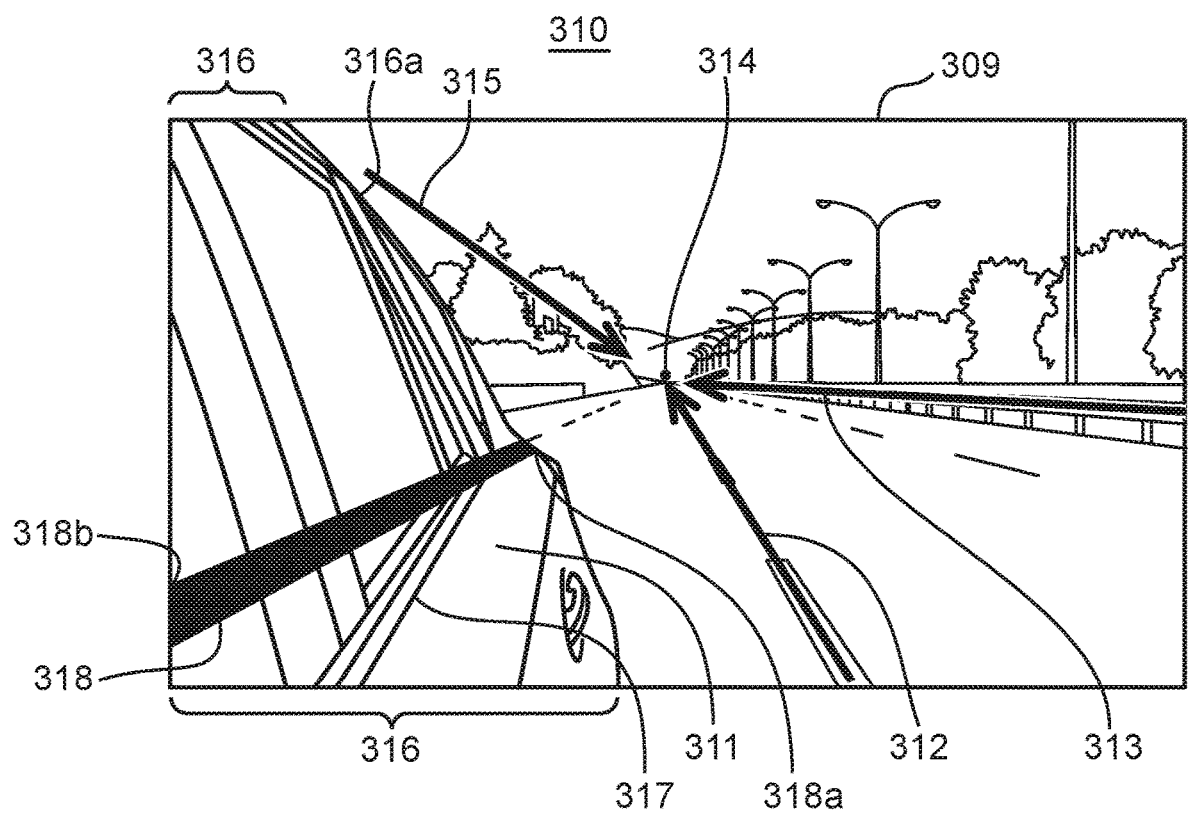
FIG. 9 is a diagram showing the rearward image which is displayed on the display by the operation in FIG. 8.

FIG. 6 is a diagram showing a different example of the rearward image 309 which is displayed on the display 310 during traveling of the vehicle 100. In FIG. 6, the display controller 413 performs coordinate transformation on the rear side surface region 316 such that the belt line 317X coinciding with the straight line that passes through the vanishing point 314 is obtained, and then, displays, on the belt line 317X, an arrow 317Y which coincides with the straight line that passes through the vanishing point 314. The belt line 317X is thereby emphasized, and the feeling of flowing to the vanishing point 314 can be increased. The display controller 413 may display a line segment image 318 as shown in FIG. 9 described later, instead of the arrow.

Moreover, in FIG. 5, the rear side surface 311X which does not cause a feeling of strangeness is displayed in the rear side surface region 316 due to coordinate transformation which uses a transformation matrix of affine transformation, but this example is not restrictive.

Figure 7:
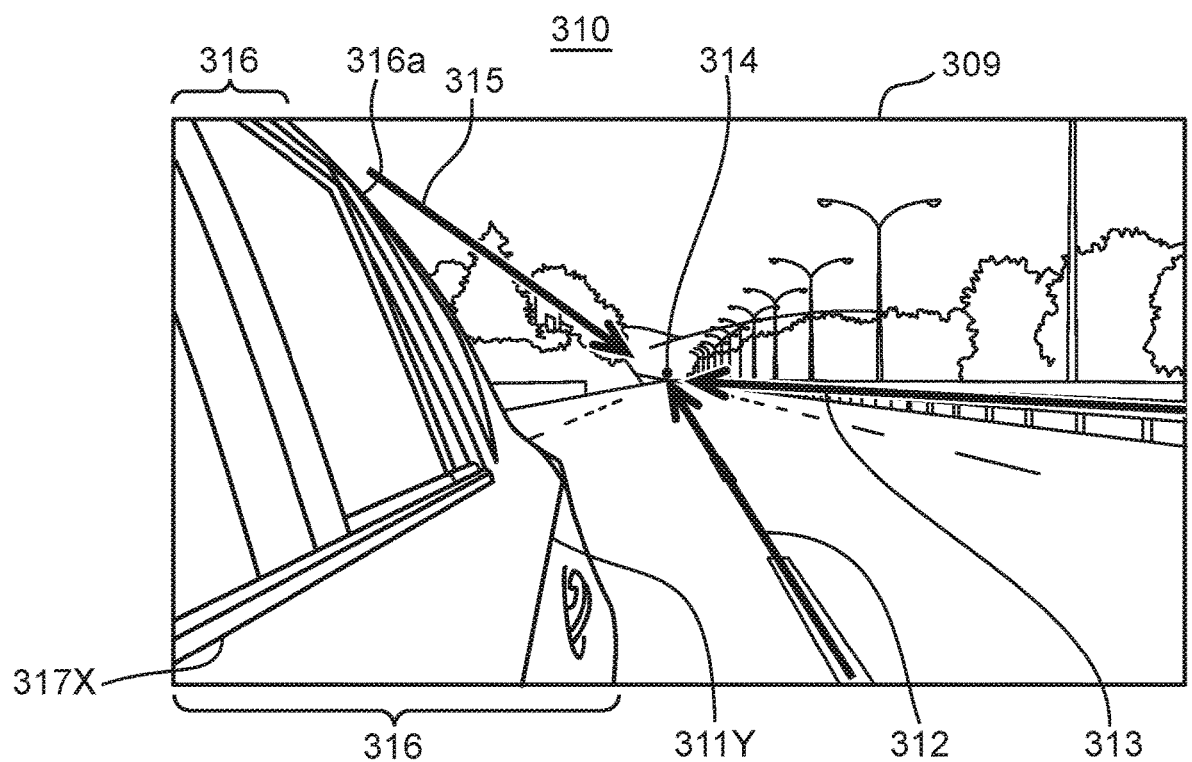
FIG. 7 is a diagram showing a further different example of the rearward image which is displayed on the display.

FIG. 7 is a diagram showing a further different example of the rearward image 309 which is displayed on the display 310 during traveling of the vehicle 100. In FIG. 7, when the belt line 317X is obtained by the method described with reference to FIG. 4, the display controller 413 cuts a window and the like above the belt line 317 (FIG. 3) at the position of the belt line 317X. The window and the like above the belt line 317 (FIG. 3) are thereby removed from below the position of the belt line 317X while the state shown in FIG. 3 is maintained. Furthermore, the display controller 413 interpolates the region between the belt line 317X and the character line 311Y below by the data of pixels between the belt line 317 (FIG. 3) and the character line 311Y.

Although a slight feeling of strangeness is caused due to an increased area between the belt line 317X and the character line 311Y, the belt line 317X which coincides with the straight line that passes through the vanishing point 314 can also be displayed in this case.

Figure 8:
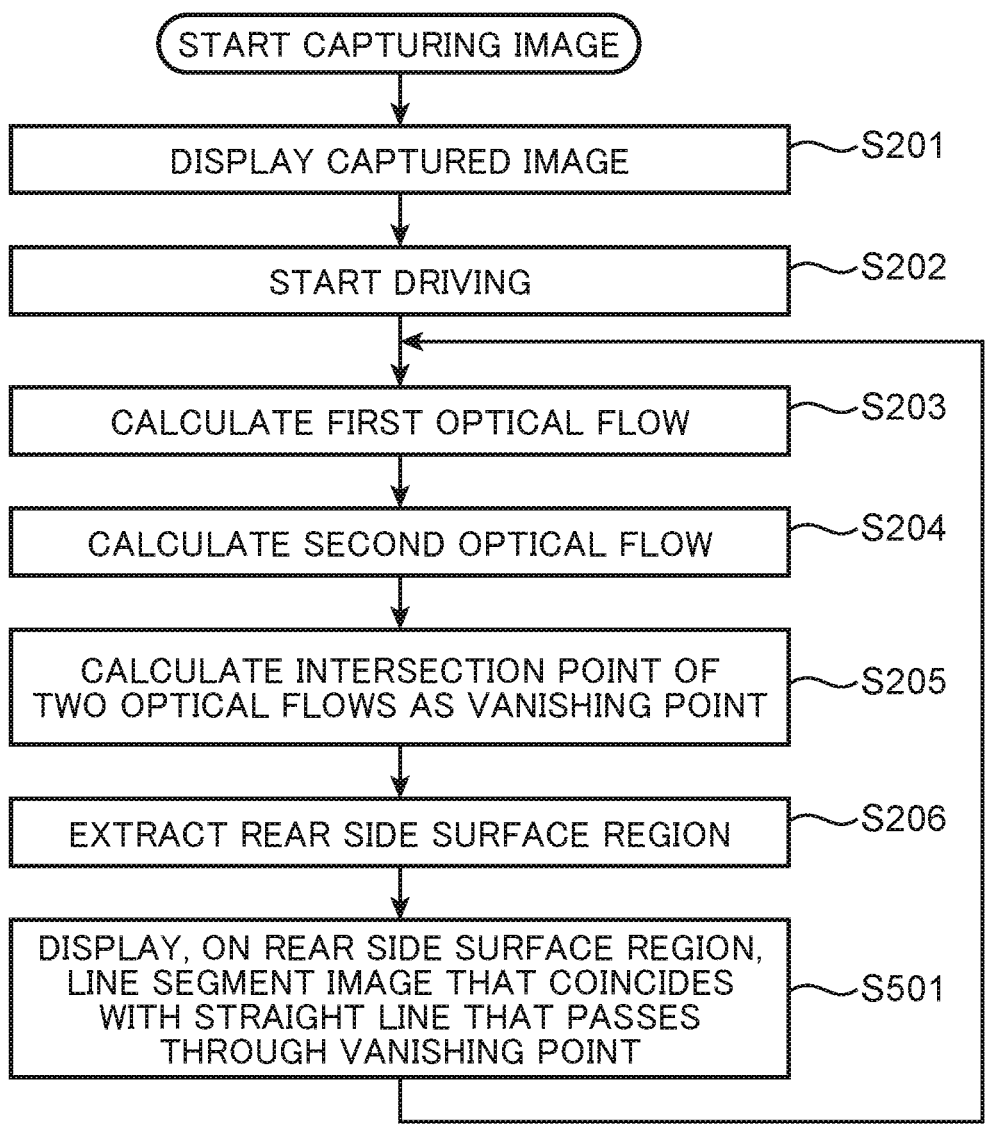
FIG. 8 is a flowchart schematically showing a different example of the operation of the vehicle.

FIG. 8 is a flowchart schematically showing a different example of the operation of the vehicle 100. FIG. 9 is a diagram showing the rearward image 309 which is displayed on the display 310 by the operation in FIG. 8. Steps S201 to S206 in FIG. 8 are the same as steps S201 to S206 in FIG. 2.

In step S501 following step S206, the display controller 413 displays, on the rear side surface region 316 extracted in step S206, a line segment image 318 (an example of the vanishing point line) which coincides with a straight line that passes through the vanishing point 314.

As shown in FIG. 9, a rear end 318a of the line segment image 318 is arranged by the display controller 413 at an arbitrary position on the boundary line 316a of the rear side surface region 316. In the example in FIG. 9, the rear end 318a of the line segment image 318 is arranged by the display controller 413 on the boundary line 316a so as to coincide with a straight line that passes through an end of the belt line 317 on the rear side and that passes through the vanishing point 314. Furthermore, a front end 318b of the line segment image 318 is arranged by the display controller 413 on the outer rim of the display 310. Moreover, the display controller 413 gradually increases the width of the line segment image 318 from the rear end 318a towards the front end 318b so as to give a sense of perspective.

In FIG. 9, as in FIG. 3, the display controller 413 displays, on the display 310, the rear side surface 311 of the vehicle 100 as it is captured by the camera 210. After step S501, the process returns to step S203, and the steps described above are repeated. The operation in FIG. 8 may end when the vehicle 100 is brought to a stop.

Also in the embodiment shown in FIGS. 8 and 9, the line segment image 318 which coincides with a straight line that passes through the vanishing point 314 and which serves the same role as an optical flow is displayed in the rear side surface region 316 where no optical flow exists. As a result, the driver can grasp the traveling environment, such as the position of the driver's vehicle, in a short time when looking at the display 310.

Figure 10:
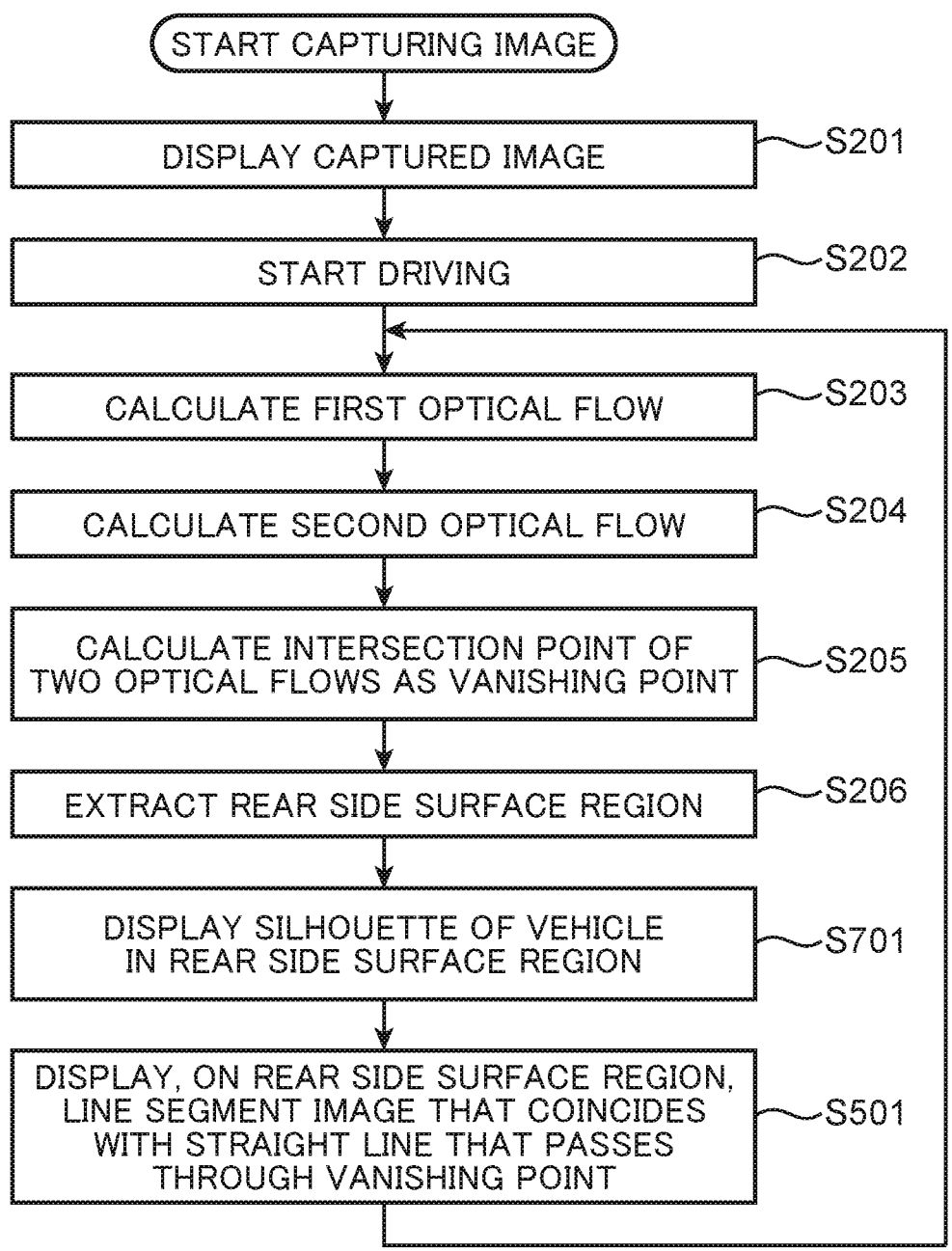
FIG. 10 is a flowchart schematically showing a further different example of the operation of the vehicle.
Figure 11:
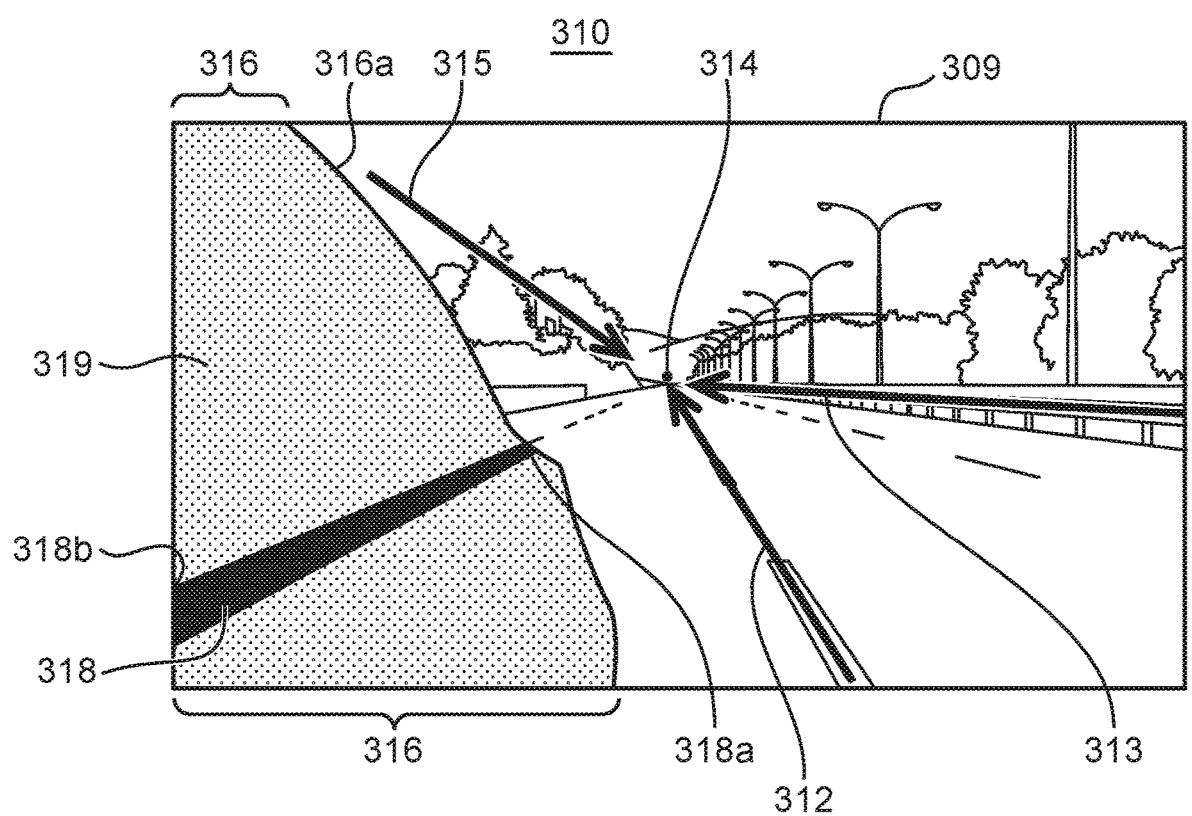
FIG. 11 is a diagram showing the rearward image which is displayed on the display by the operation in FIG. 10.

FIG. 10 is a flowchart schematically showing a further different example of the operation of the vehicle 100. FIG. 11 is a diagram showing the rearward image 309 which is displayed on the display 310 by the operation in FIG. 10. Steps S201 to S206 in FIG. 10 are the same as steps S201 to S206 in FIG. 2.

As shown in FIG. 11, in step S701 following step S206, the display controller 413 displays, instead of the rear side surface of the vehicle 100, a silhouette 319 of the vehicle on the rear side surface region 316 extracted in step S206. The display controller 413 may display, as the silhouette 319, an image obtained by painting over the rear side surface region 316 with a solid color. The following step S501 is the same as step S501 in FIG. 8. Then, the process returns to step S203, and the steps described above are repeated. The operation in FIG. 10 may end when the vehicle 100 is brought to a stop.

Also in the embodiment shown in FIGS. 10 and 11, the line segment image 318 which coincides with a straight line that passes through the vanishing point 314 and which serves the same role as an optical flow is displayed in the rear side surface region 316 where no optical flow exists. As a result, the driver can grasp the traveling environment, such as the position of the driver's vehicle, in a short time when looking at the display 310.

Furthermore, in the embodiment shown in FIGS. 10 and 11, the silhouette 319 of the vehicle is displayed in the rear side surface region 316, instead of the rear side surface of the vehicle 100. Accordingly, the line segment image 318 is more contrasted, and the line segment image 318 is allowed to stand out.

In FIGS. 9 and 11, the line segment image 318 extends from the boundary line 316a of the rear side surface region 316 to the outer rim of the display 310, but this example is not restrictive. The line segment image 318 may be displayed in a part of the rear side surface region 316. That is, a line segment image to be displayed overlapping the rear side surface region 316 may be shorter than the line segment image 318 shown in FIGS. 9 and 11. The length of the line segment image 318 is long enough if the driver is caused to pay attention, for example.

Next, an experiment result of "pre-cueing method" performed to check the effects of the present embodiment will be described. According to the "pre-cueing method", a detection time is measured for points of light (target) which are presented on the right or left of a fixed viewpoint following a cue. The experiment is conducted based on a cue, and a valid condition in which the cue indicates a spatial position of the target and an invalid condition in which the cue does not indicate the spatial position of the target are set.

Figure 12:
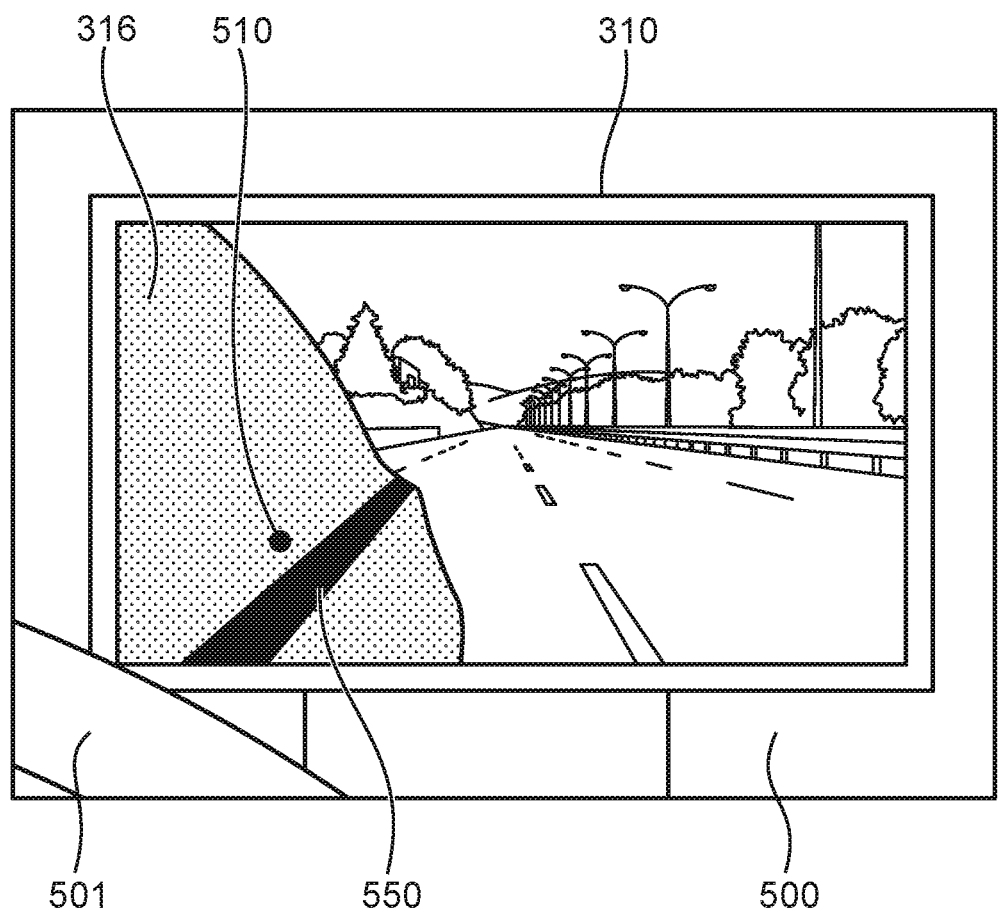
FIG. 12 is a diagram showing the display which is installed inside the vehicle.
Figure 13:
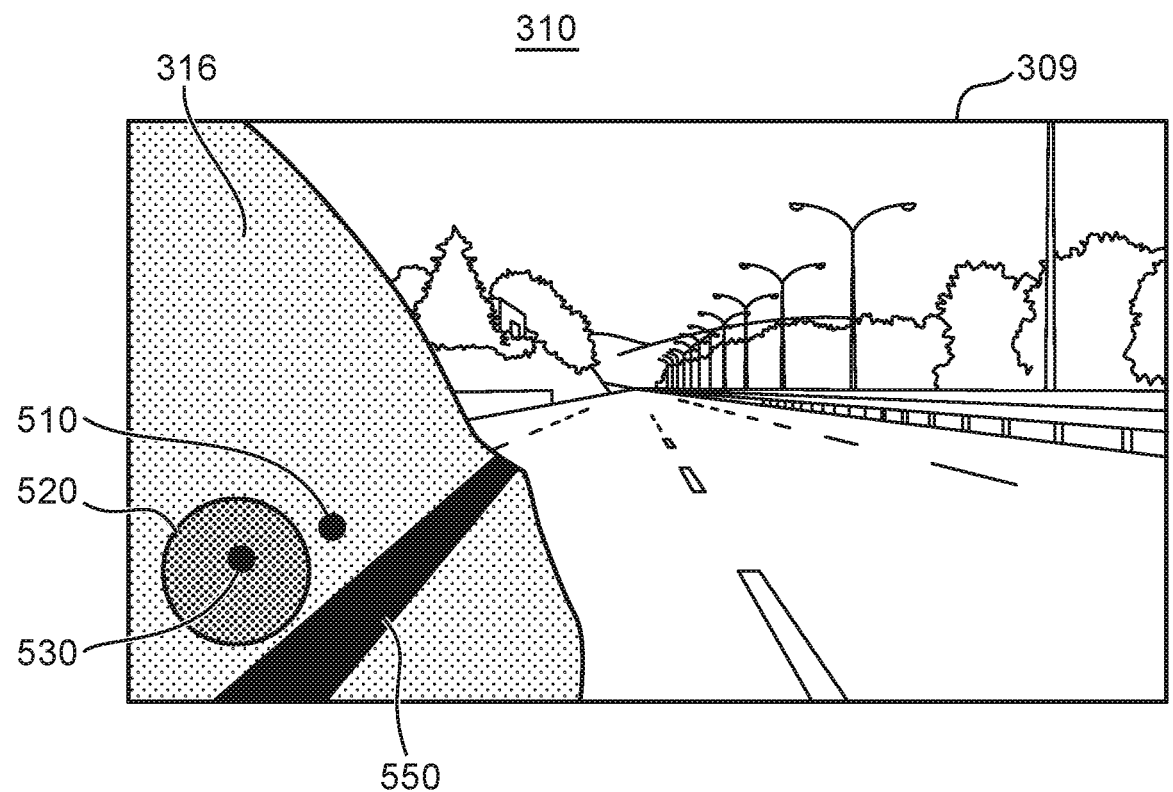
FIG. 13 is a diagram for describing a valid condition set in an experiment.
Figure 14:
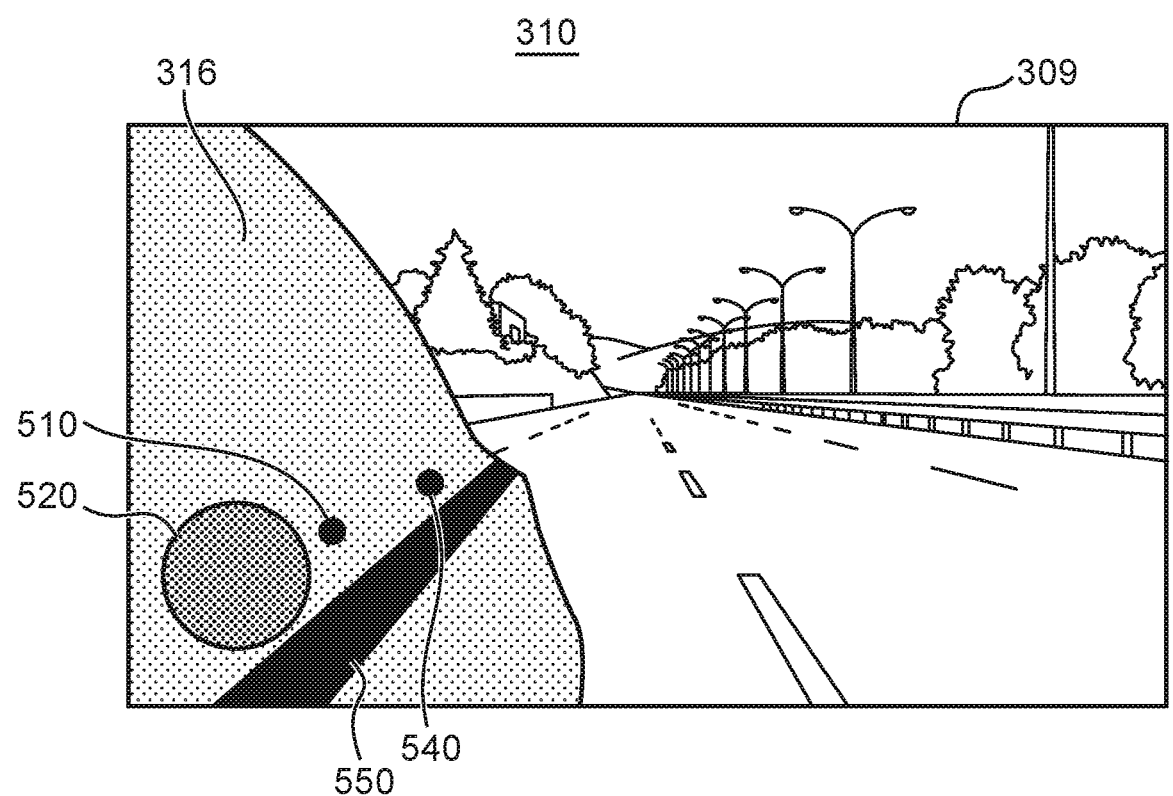
FIG. 14 is a diagram for describing an invalid condition set in the experiment.

FIG. 12 is a diagram showing the display 310 which is installed inside the vehicle 100. FIG. 13 is a diagram for describing the valid condition set in the experiment. FIG. 14 is a diagram for describing the invalid condition set in the experiment.

The experiment was conducted for a vehicle traveling on a straight road at a speed of 100 km/h. As shown in FIG. 12, the display 310 is arranged in an instrument panel 500, slightly on the right side of a steering wheel 501. In this experiment, as in the embodiment in FIGS. 10 and 11, the silhouette of the vehicle is displayed in the rear side surface region 316, instead of the rear side surface of the vehicle. Moreover, as shown in FIGS. 12 to 14, in the rear side surface region 316, a light-emitting diode (LED) indicating a fixed viewpoint 510 is lighted, and a line segment image 550 is displayed.

In the experiment, first, an LED which is to be lighted is taught to a subject as a cue. In this case, an LED 530 more to the front than the fixed viewpoint 510 is lighted. As a result, the attention of the subject is directed to a region 520 more to the front than the fixed viewpoint 510, as shown in FIGS. 13 and 14. Next, the subject moves the subject's gaze to the fixed viewpoint 510. Then, a target is displayed. The subject then gives an answer as to the position of the displayed target.

At this time, as shown in FIG. 13, according to the valid condition, the LED 530 more to the front than the fixed viewpoint 510 is lighted as the target. That is, according to the valid condition, the cue and the target coincide with each other, and the subject can thus immediately give an answer as to the position of the target.

On the other hand, as shown in FIG. 14, according to the invalid condition, an LED 540 more to the back than the fixed viewpoint 510 is lighted as the target. That is, according to the invalid condition, the subject is to give an answer as to the position of the target by shifting subject's attention from the region 520 to the LED 540.

Accordingly, when a reaction time under the valid condition is given as T1, and a reaction time under the invalid condition is given as T2, (T2−T1) is the time needed to shift the attention. That is, if (T2−T1) is shorter, the attention can be more smoothly shifted. In the experiment, comparison was performed with respect to (T2−T1), while changing the direction of the line segment image 550.

Figure 15:
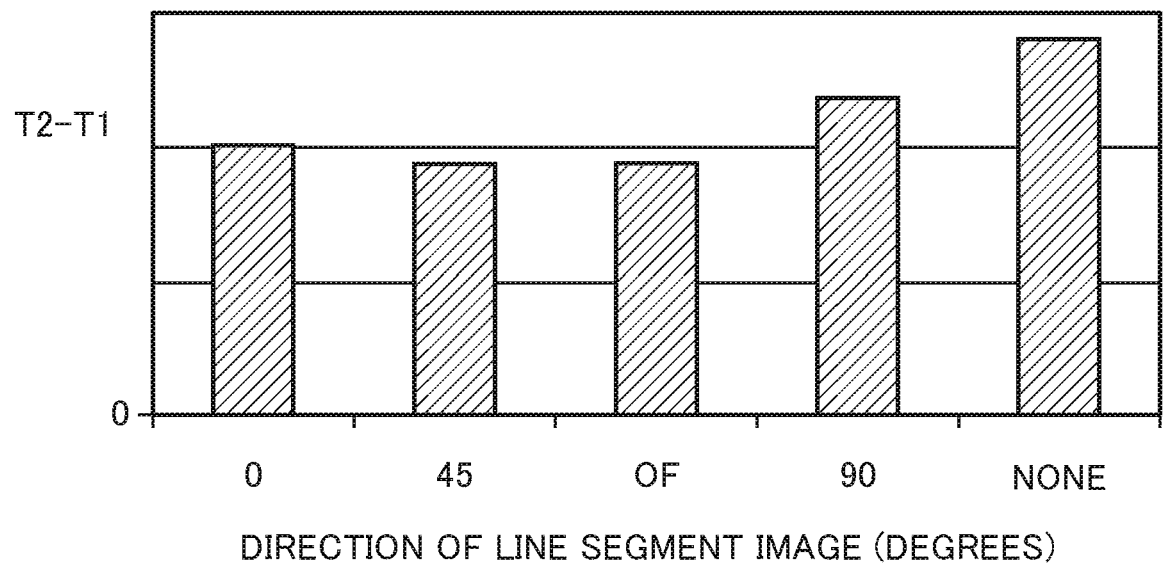
FIG. 15 is a diagram showing an experiment result for a first subject.

FIG. 15 is a diagram showing an experiment result for a first subject A. FIG. 16 is a diagram showing an experiment result for a second subject B. FIGS. 15 and 16 respectively show average values of experiments performed three times.

The experiment was conducted using five states in which the direction of the line segment image 550 was perpendicular (0 degrees), 45 degrees from perpendicular, coincident with the line segment image 318 (FIG. 9) (OF), and 90 degrees from perpendicular, and in which the line segment image 550 was not displayed (none).

As shown in FIG. 15, with the first subject A, (T2−T1) is the shortest when the line segment image 550 coincident with the line segment image 318 (FIG. 9) is displayed. As shown in FIG. 16, with the second subject B, (T2−T1) is also the shortest when the line segment image 550 coincident with the line segment image 318 (FIG. 9) is displayed.

It can be found from the experiment results in FIGS. 15 and 16 that, when the line segment image 318 (FIG. 9) is displayed in the rear side surface region 316, a driver can grasp the traveling environment, such as the position of the driver's vehicle, in a short time when looking at the display 310.

In each embodiment described above, the calculator 411 calculates the intersection point of the optical flows 312, 313 as the vanishing point 314, but the calculation method of the position of the vanishing point 314 is not limited to such a method. Alternatively, the calculator 411 may detect, from one rearward image 309, two straight lines among lines such as a straight line indicating an edge of a road, such as a shoulder of the road or a central reservation, and a boundary line indicating the boundary between lanes, for example, and may calculate the intersection point of the detected two straight lines as the vanishing point.

The specific embodiments described above mainly include the invention having the following configurations.

An aspect of the technique disclosed herein includes: an imager which is installed in a vehicle, and captures a rearward image including a rear side surface of the vehicle during traveling; a display which displays the rearward image captured by the imager; a calculator which calculates a position of a vanishing point from the rearward image; an extractor which extracts, in the rearward image, a rear side surface region where the rear side surface of the vehicle is displayed; and a display controller which displays, in the rear side surface region, a vanishing point line which coincides with a straight line passing through the vanishing point.

According to this aspect, the position of the vanishing point is calculated from the rearward image captured by the imager. The rear side surface region where the rear side surface of the vehicle is displayed is extracted in the rearward image. The vanishing point line which coincides with the straight line which passes through the vanishing point is displayed in the rear side surface region. Accordingly, the vanishing point line which serves as an optical flow is displayed in the rear side surface region where no optical flow exists. As a result, a driver can grasp the traveling environment in a short time based on an indirect vision displayed on the display.

In the aspect described above, for example, a belt line or a character line may be provided on the rear side surface of the vehicle which is to be captured by the imager, and when displaying the rear side surface of the vehicle captured by the imager in the rear side surface region on the display, the display controller may change a shape of the belt line or the character line such that the belt line or the character line coincides with the straight line passing through the vanishing point, and may display the belt line or the character line, the shape of which is changed, as the vanishing point line.

According to this aspect, when the rear side surface of the vehicle captured by the imager is displayed in the rear side surface region on the display, the shape of the belt line or the character line is changed such that the belt line or the character line coincides with the straight line which passes through the vanishing point, and the belt line or the character line, the shape of which is changed, is displayed as the vanishing point line. Accordingly, the belt line or the character line provided on the rear side surface of the vehicle serves as an optical flow. As a result, a driver can grasp the traveling environment in a more natural manner based on the belt line or the character line which the driver is used to seeing.

In the aspect described above, for example, the display controller may display, as the vanishing point line, a line segment image which coincides with the straight line passing through the vanishing point, in the rear side surface region.

According to this aspect, the line segment image that coincides with the straight line that passes through the vanishing point is displayed, in the rear side surface region, as the vanishing point line. Accordingly, the line segment image that serves the role of an optical flow is displayed, as the vanishing point line, in the rear side surface region where no optical flow exists. As a result, a driver can grasp the traveling environment in a short time based on an indirect vision which is displayed on the display.

In the aspect described above, for example, the display controller may display a silhouette of the vehicle in the rear side surface region, instead of the rear side surface of the vehicle. According to this aspect, a silhouette of the vehicle is displayed, instead of the rear side surface of the vehicle, in the rear side surface region. Thus, the line segment image which is displayed in the rear side surface region as the vanishing point line is allowed to stand out.

The invention claimed is:

1. An electronic mirror control device comprising:
   an imager which is attached to a side-view mirror of a vehicle or to a position where the side-view mirror was to be attached, with an optical axis of the imager extending towards a rear side of the vehicle, and captures a rearward image including a rear side surface of the vehicle during traveling;
   a display which is disposed in front of a driver's seat of the vehicle, and displays the rearward image captured by the imager;
   a calculator which calculates a first optical flow and a second optical flow from the rearward image, and calculates an intersection point of the first optical flow and the second optical flow as a vanishing point;

an extractor which extracts, in the rearward image, a rear side surface region where the rear side surface of the vehicle is displayed; and a display controller which displays, in the rear side surface region, a vanishing point line which coincides with a straight line passing in a direction toward the vanishing point.

2. The electronic mirror control device according to claim 1, wherein the imager captures a belt line or a character line which is provided on the rear side surface of the vehicle, the belt line is a line which extends in a horizontal direction at a lower end of a side window of a vehicle body of the vehicle, a line which divides an upper part and a lower part of the vehicle body at the position of the window, and an upper end line of the lower part of the vehicle body, the upper end line extending along a door in the horizontal direction, the character line is a line which is formed by surfaces merging to establish aesthetic automotive design, or a line which is added to a smooth surface of the vehicle to establish aesthetic automotive design, and when displaying the rear side surface of the vehicle captured by the imager in the rear side surface region on the display, the display controller changes a shape of the belt line or the character line such that the belt line or the character line coincides with the straight line passing in a direction toward the vanishing point, and displays the belt line or the character line, the shape of which has been changed, as the vanishing point line.

3. The electronic mirror control device according to claim 1, wherein the display controller additionally displays, as the vanishing point line, a line segment image which coincides with the straight line passing in a direction toward the vanishing point, on the rear side surface region.

4. The electronic mirror control device according to claim 3, wherein the display controller displays a silhouette of the vehicle in the rear side surface region, instead of the rear side surface of the vehicle.

* * * * *